June 11, 1940.  C. A. SIFAKAS  2,204,284

POULTRY NEST

Filed Aug. 10, 1937  2 Sheets-Sheet 1

INVENTOR
Constantin A. Sifakas
BY
Brown & Seward
ATTORNEYS

June 11, 1940.  C. A. SIFAKAS  2,204,284
POULTRY NEST
Filed Aug. 10, 1937  2 Sheets-Sheet 2
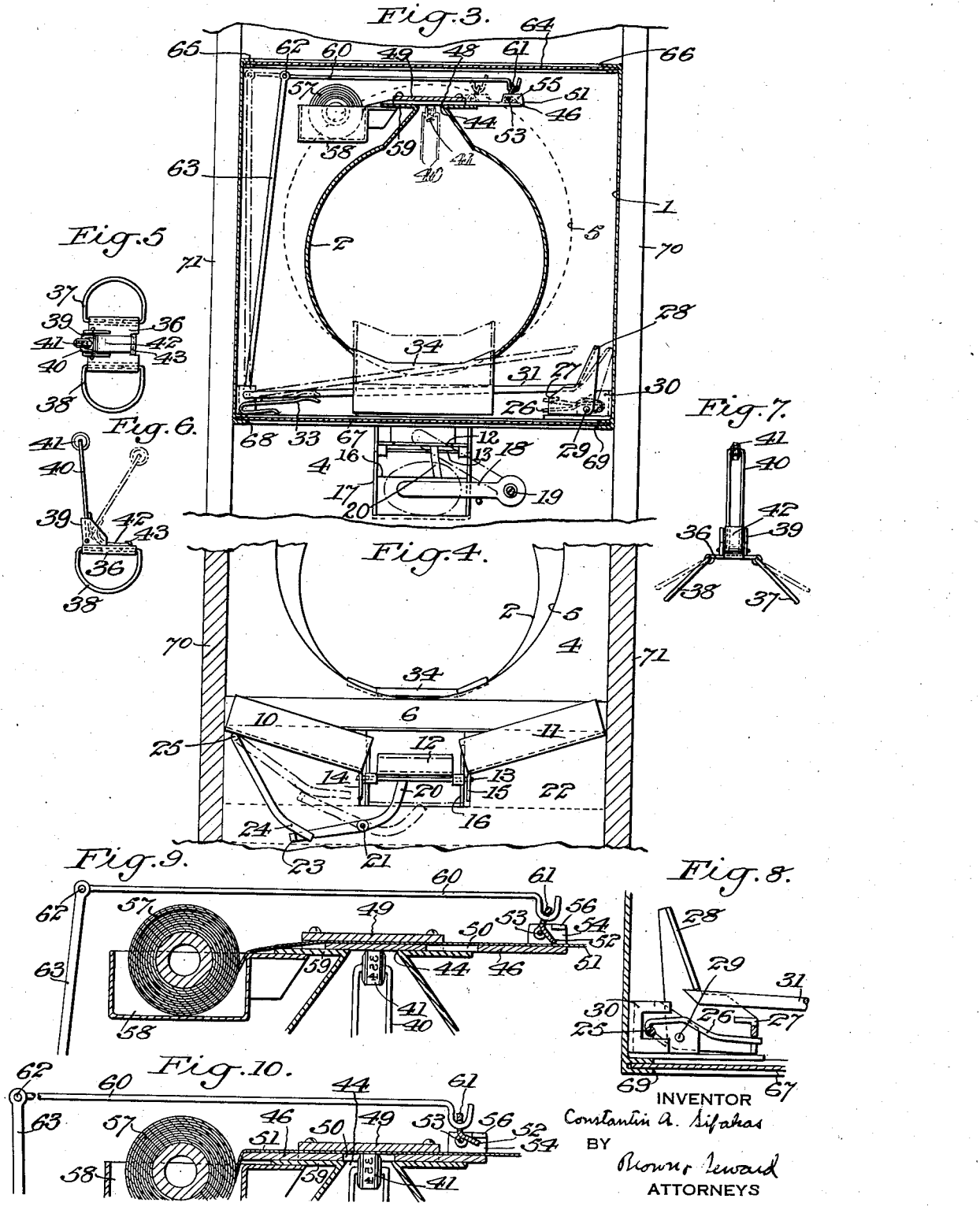
INVENTOR
Constantin A. Sifakas
BY
ATTORNEYS Patented June 11, 1940

2,204,284

UNITED STATES PATENT OFFICE 2,204,284

POULTRY NEST

Constantin A. Sifakas, New York, N. Y.

Application August 10, 1937, Serial No. 158,267

9 Claims. (Cl. 119—48)

This invention relates to an improvement in poultry nests and has for an object to provide a nest in which a record is automatically made by the hen after she has deposited the egg in the nest and is making her exit therefrom.

Another object of the invention is to provide a nest in which the hen may enter or leave at will without recording the same until she has laid an egg in the nest.

Another object is to provide a nest having a device for protecting the recording mechanism which is not released or exposed until an egg has been deposited in the nest so that a hen laying an egg will automatically record her number or character thereon as she leaves the nest, whereupon she will actuate the device to close the recording mechanism for the next hen entering the nest, thereby allowing any unproductive hens to enter and retreat from the nest without actuating the recording mechanism.

Another object is to provide a nest which will be simple and inexpensive to manufacture, sanitary, efficient, and durable in service.

Another object is to provide certain improvements in the form, construction and arrangement of the several parts whereby the above named and other objects may effectively be attained.

A practical embodiment of my invention is represented in the accompanying drawings, in which Fig. 1 represents a horizontal section of my improved nest taken in the plane of the line I—I of Fig. 2 looking in the direction of the arrows;

Fig. 3 represents a vertical section taken in the plane of the line III—III of Fig. 1, looking in the direction of the arrows;

Fig. 4 represents a detail vertical section taken in the plane of the line IV—IV of Fig. 1, looking in the direction of the arrows;

Fig. 5 represents a plan view of the record producing means carried by the hen and having her designating number or character thereon;

Fig. 6 represents a side elevation of the same;

Fig. 7 represents a rear end elevation of the same;

Fig. 8 represents a detail vertical section, on an enlarged scale, taken in the plane of the line VIII—VIII of Fig. 1, looking in the direction of the arrows and showing the latch and adjacent parts for controlling and actuating the recording mechanism;

Figure 1:
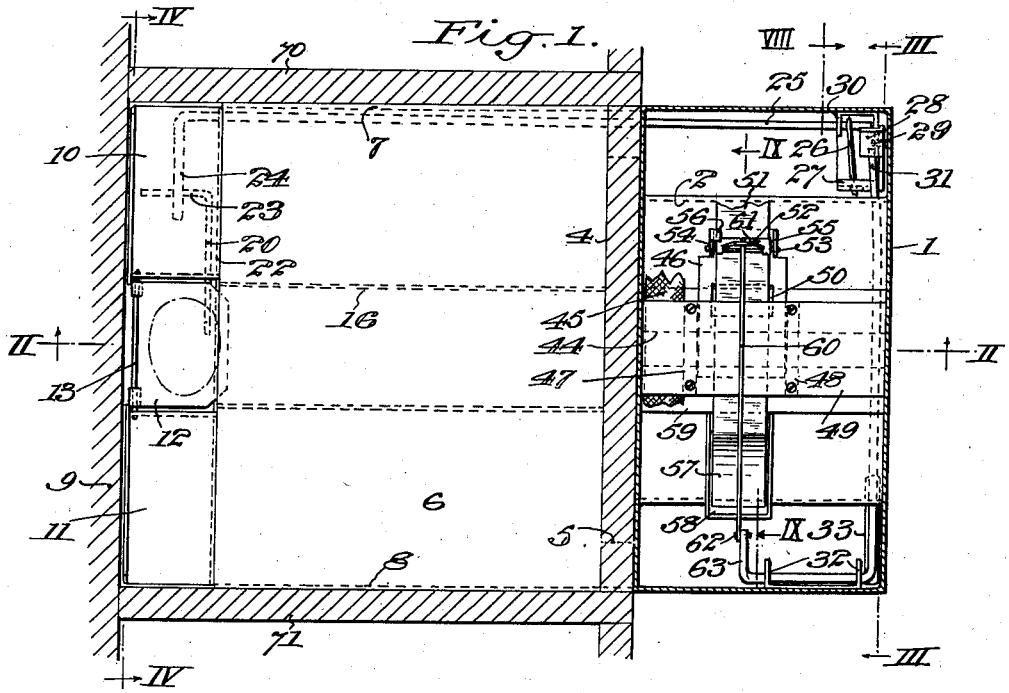
Figure 2:
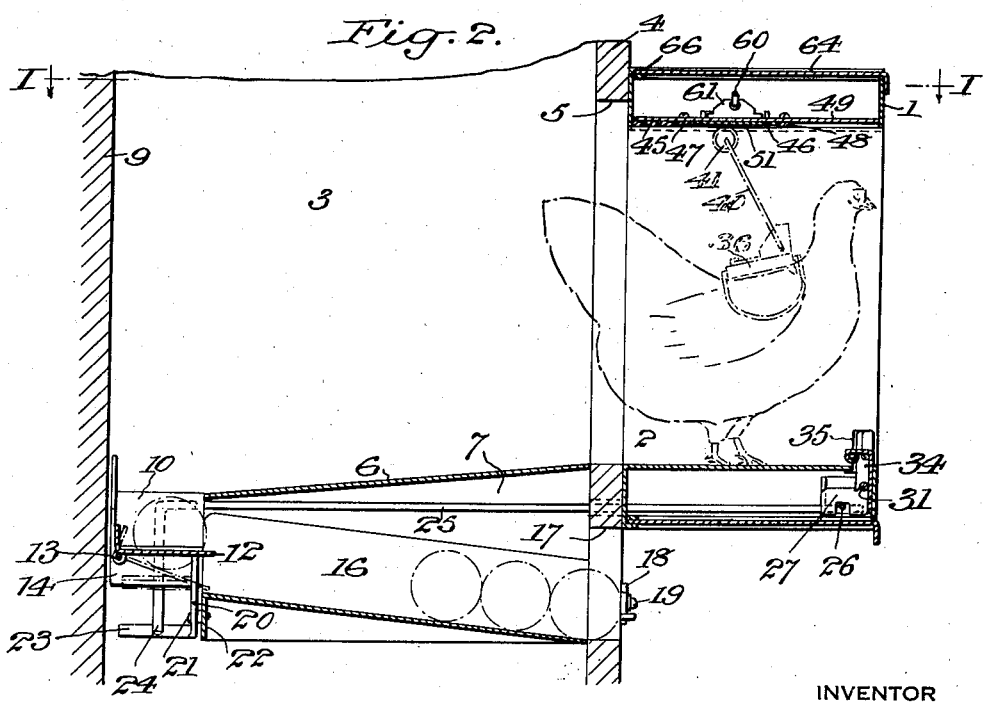
Fig. 2 represents a longitudinal, vertical section taken in the plane of the line II—II of Fig. 1, looking in the direction of the arrows.

Fig. 9 represents a detail vertical central section taken in the plane of the line IX—IX of Fig. 1, looking in the direction of the arrows of the recording mechanism and adjacent parts, showing the mechanism in its inoperative position with respect to the printing roll of the designating device; and Fig. 10 represents a similar view with the parts in their operative position and the printing roll in contact with the record web.

The poultry nest comprises a housing 1 of general rectangular shape in cross section in any direction and is provided with a tubular passage 2 centrally disposed thereon to form an entrance and exit to and from the nest compartment 3. The housing is preferably formed of sheet metal and secured to an interior wall 4 of the poultry house in any well known or approved manner, while the nest compartment 3 is arranged at the rear of the interior wall 4. The wall 4 has an opening 5 arranged to register with the passage 2, which opening communicates with the nest compartment. The nest compartment is provided with a removable floor 6 of sheet metal which rests on the side walls 7, 8 of the compartment and is inclined downwardly toward the rear 9 of the coop. At the end of the floor 6 there are provided guides 10, 11 oppositely inclined downwardly toward the center, between which guides a horizontally arranged platform 12 is hinged at 13 to swing between the vertically disposed walls 14, 15 of the guides 10, 11 respectively. The inclination of the floor 6 and guides 10, 11 serves to direct the egg, deposited by the hen on the floor 6, by gravitation to the platform 12. The nest compartment is also provided with a channel 16 inclined downwardly toward the interior wall 4 and in alinement with the platform 12 so that the weight of the egg will rock the platform downwardly on the pintle 13 and direct the egg into the channel 16 where it will roll by gravity toward the outlet 17 in the wall 4. The channel 16 is of such width as to aline the eggs in the order in which they are deposited. A stop 18 pivoted at 19 on the wall 4 serves to limit the movement of the first egg deposited in the channel 16, while the remainder will rest adjacent each other.

The means for holding the platform in its position to receive an egg comprises a lever 20 pivoted at 21 on a wall 22 of the nest compartment and having an arm 23 arranged to receive the bent end 24 of a rock shaft 25, one end of which is journaled in the wall 22 and the other end in the wall of the housing 1. The end of rock shaft 25 located in the housing 1 is provided with an arm 26 bent to engage one element 27 of a gravity operated latch 28 which is pivoted at 29 on a bracket 30 fast on the housing 1. Thus, by reason of the weight of the bent end 24 of the shaft 25 resting upon the arm 23 of the lever 20 the platform 12 is normally held in position to receive the egg. The latch 28 is held in operative position by the free end of a bell crank lever 31 having its fulcrum at 32 on the wall of the housing 1 and urged upwardly by a spring 33, see Fig. 3. This bell crank lever 31 is actuated by a plunger 34 vertically disposed and movable in a slot 35 cut in the bottom of the passage 2. The plunger 34 rests upon the lever 31 and is moved downwardly against the tension of the spring 33 by the weight of the hen stepping upon the plunger 34 as she enters the passage to the nest compartment 3. After the hen has laid the egg on the floor 6, it gravitates to the platform, where by its weight, the platform will tilt and roll the egg into the channel. This movement of the platform by the egg causes the lever 20 to move its arm 23 which in turn rocks the shaft 25 and hence the element 27 and latch 28, thereby releasing the bell crank lever 31 which moves the plunger 34 upwardly to the position shown in dot and dash outline in Fig. 3. When the hen passes from the nest compartment through the opening 5 and passage 2, she will again be caused to step upon the plunger 34, thereby pressing it downwardly and actuating the latch 28 so that any hen entering and retreating from the nest compartment and housing will not disturb or actuate the parts unless she deposits an egg in the nest compartment.

In order that the productive hen may be registered and recorded, I provide each hen with a record producing device comprising a saddle 36 of light metal or other suitable material having yokes 37, 38 hinged thereto and arranged to encircle the wings of the hen and hold the saddle securely in position on the back of the hen. A bracket 39 is fixed to the saddle 36 and has pivoted therein a light metal arm 40 having a roller 41 rotatably mounted thereon and provided with a designating number or character. The arm 40 is yieldingly held in position by means of a spring 42 secured to the saddle at 43. This device is constructed extremely light in weight so that it does not affect or interfere with the natural movements of the hen.

When the hen passes through the passage 2, the roller 41 with its arm 40 will enter a longitudinal recess 44 in the roof of the passage, which recess has an opening therein to expose an ink pad 45 of a recording mechanism which includes a reciprocating carriage 46 mounted in tracks 47, 48 bridged by a plate 49. The carriage has a window 50 at one end thereof which is arranged to be brought into and out of register with the recess 44 in the roof of the passage, so as to expose or cover a web of paper 51 which is passed between the bridge plate 49 and carriage 46. The web 51 is held in one direction on the carriage as it travels forwardly to place the window out of register with the recess by means of an oscillating nipper 52 pivoted at 53 between ears 54, 55 on the carriage, which nipper 52 is limited in its upward movement by a lug 56 extending outwardly from the ear 54. A supply roll 57 of the web rests in a cup 58 fixed to the wall 59 of the recess 44.

The carriage 46 is reciprocated by means of a link 60, one end of which is loosely connected to an extension 61 of the nipper 52, while the other end is pivoted at 62 to the upper end of the arm 63 of the bell crank lever 31, so that as the lever 31 is pressed downwardly by the movement of the plunger 34, the arm 63 will be moved to the right as shown in Figs. 3 and 9, which movement pushes the link 60 and the extension 61 forwardly so that the nipper 52 will be rocked on its pivot 53 and brought into engagement with the web 51 and thereby pinch it to the carriage 46 to be moved therewith.

In this position it will be clearly seen in Fig. 9 that the window 50 is out of register with the recess 44 so that the roller 41 of the record producing device as it passes the recess will not contact with the web 51. When the bell crank lever 31 is released from the latch 28 by the act of depositing an egg on the platform 12, the spring 33 raises the lever 31 to the position shown in dot and dash outline in Fig. 3, and rocks the arm 63 to the left as shown in Fig. 10. In this movement the link 60 rocks the nipper 52 away from the web 51 and slides the carriage thereunder so that the window 50 will be brought into register with the recess 44 and allow the roller 41 of the record producing device on the hen to contact with the web and make an imprint of the number or character thereon.

From the foregoing it will be understood that as each egg is deposited by the hen, her respective number or character will be recorded on the web 51 as she passes from the passage 2 and each egg will be rolled into the channel 16 and remain in consecutive order corresponding to the several imprints on the web made by the rollers carried by the hens. The housing 1 is provided with a cover 64 slidable in grooves 65, 66 on the housing to protect and conceal the recording and adjacent mechanism disposed therein. A bottom 67 is slidably mounted in grooves 68, 69 on the housing so that the mechanism adjacent the bottom may be protected.

The poultry nests above described are constructed and arranged so that they may be easily and readily installed in poultry houses of ordinary construction now in common use, and with the minimum amount of time and labor. The side walls 70 and 71 may well be regarded as partitions of ordinary nests, while the wall 9 and wall 4 also form the front and back of the same. The roof and bottom of the nests (not shown) are also of the well known construction and serve no function in the present invention.

It will be understood that various changes may be resorted to in the form, construction and arrangement of the several parts without departing from the spirit and scope of my invention; and hence I do not intend to be limited to the details herein shown and described, except as they may be included in the claims.

What I claim is:

1. A nest for poultry comprising, a nest compartment, a housing having a tubular passage therethrough communicating with said compartment and forming a free entrance and exit to and from the compartment, an egg receiving channel connected with the compartment, a hinged platform interposed between the compartment and channel and normally closing said channel, said platform being actuated by the weight of the egg thereon to deliver it to the channel, a record receiving mechanism above said passage, means for exposing and covering the record receiving mechanism, said means comprising a vertically movable plunger, a spring pressed bell crank lever in the housing connected to actuate the record receiving mechanism and oscillated by the movement of the plunger, and a latch adapted to engage said lever and connected with the platform, said latch being moved by the actuation of the platform to release the lever and plunger and expose the record receiving mechanism.

2. A nest for poultry comprising, a nest compartment, a housing having a tubular passage therethrough communicating with said compartment and forming a free entrance and exit to and from the compartment, an egg receiving channel connected with the compartment, a hinged platform interposed between the compartment and channel and normally closing said channel, said platform being actuated by the weight of the egg thereon to deliver it to the channel, a record receiving mechanism above said passage, means for exposing and covering the record receiving mechanism, said means comprising a vertically movable plunger, a spring pressed bell crank lever in the housing connected to actuate the record receiving mechanism and oscillated by the movement of the plunger, and a gravity operated latch adapted to engage said lever and connected with the platform, said latch being moved by the actuation of the platform to release the lever and plunger and expose the record receiving mechanism, said plunger being moved by the hen when stepping thereon.

3. A nest for poultry comprising, a nest compartment, a housing having a tubular passage therethrough communicating with said compartment and forming a free entrance and exit to and from the compartment, an egg receiving channel connected with the compartment, a hinged platform interposed between the compartment and channel and normally closing the channel, said platform being actuated by the weight of the egg thereon to deliver it to the channel, a record receiving mechanism above said passage, said mechanism comprising a web, a reciprocating carriage having an opening therein to expose the web, an oscillating nipper mounted on said carriage and adapted to engage and feed the web with the forward movement of the carriage and an ink supplying means disposed adjacent said mechanism, means controlled by the movement of the platform for moving the carriage in one direction to expose the web, a record producing means attachable to the back of the hen for contacting the exposed web when the hen is passing through the passage, and a spring pressed device in said passage for moving the carriage in the other direction to cover the web after the hen has made the imprint on the web, said device being moved by the hen stepping thereon.

4. A nest for poultry comprising, a nest compartment having a flat bottom inclined downwardly toward the rear thereof, an egg receiving and aligning channel connected with said compartment, a platform disposed at the rear end of said inclined bottom of the compartment above the channel for arresting the movement of the egg and directing it forwardly into the channel, a record receiving mechanism having a web, and a spring pressed means actuated by the downward movement of the platform for moving said mechanism to expose the web to be acted upon by the hen leaving the nest.

5. A nest for poultry comprising, a nest compartment having a flat bottom inclined downwardly toward the rear thereof, a housing in open communication with said compartment, an egg receiving and aligning channel connected with the compartment, a hinged platform disposed at the rear end of said inclined bottom of the compartment above the channel for arresting the movement of the egg, said platform being actuated by the weight of the egg thereon to deliver it to the channel, a record receiving mechanism having a web in said housing, and a spring pressed means controlled by the movement of the platform for moving the mechanism to expose the web to be acted upon by the hen leaving the housing.

6. A nest for poultry comprising, a nest compartment having a flat bottom inclined downwardly toward the rear thereof, a housing having a tubular passage therethrough communicating with said compartment and forming an unobstructed entrance and exit to and from the compartment, a longitudinal recess in the roof of said passage, an egg receiving and aligning channel connected with the compartment, a hinged platform disposed at the rear end of said inclined bottom of the compartment above the channel and normally closing said channel, said platform being actuated by the weight of the egg thereon to deliver it to the channel, an opening in said recess, a record receiving mechanism in said housing above the recess, said mechanism having a web and an element provided with an opening therein, and a spring pressed means controlled by the movement of the platform for bringing said opening in the element into register with the opening in the recess to expose the web to be acted upon by the hen leaving the passage.

7. A nest for poultry comprising, a nest compartment having a bottom inclined downwardly toward the rear thereof, a housing having a tubular passage therethrough communicating with said compartment and forming an unobstructed entrance and exit to and from the compartment, a longitudinal recess in the roof of said passage, an egg receiving and aligning channel connected with the compartment, a hinged platform disposed at the rear end of said inclined bottom of the compartment above the channel and normally closing said channel, said platform being actuated by the weight of the egg thereon to deliver it to the channel, an opening in said recess, a record receiving mechanism in said housing above the recess, said mechanism having a web and an element provided with an opening therein, means connected with the element and platform for bringing the opening in the element into register with the opening in the recess to expose the web to be acted upon by the hen leaving the passage, and a reciprocating device in the bottom of said passage adjacent the entrance for moving the element to close the opening in the recess.

8. A nest for poultry comprising, a nest compartment having a bottom inclined downwardly toward the rear thereof, a housing having a tubular passage therethrough communicating with said compartment and forming an unobstructed entrance and exit to and from the compartment, a longitudinal recess in the roof of said passage, an egg receiving and aligning channel connected with the compartment, a hinged platform disposed at the rear end of said inclined bottom of the compartment above the channel and normally closing said channel, said platform being actuated by the weight of the egg thereon to deliver it to the channel, an opening in said recess, a record receiving mechanism in said housing above the recess, said mechanism having a web and an element provided with an opening therein, means connected with the element and platform for bringing the opening in the element into register with the opening in the recess to expose the web to be acted upon by the hen leaving the passage, and a reciprocating device in the bottom of said passage adjacent the entrance for moving the element to close the opening in the recess, said device being actuated by the hen stepping thereon.

9. A nest for poultry comprising, a nest compartment having a bottom inclined downwardly toward the rear thereof, a housing having a tubular passage therethrough communicating with said compartment and forming an unobstructed entrance and exit to and from the compartment, a longitudinal recess in the roof of said passage, an egg receiving and aligning channel connected with the compartment, a hinged platform disposed at the rear end of said inclined bottom of the compartment above the channel and normally closing said channel, said platform being actuated by the weight of the egg thereon to deliver it to the channel, an opening in said recess, a record receiving mechanism in said housing above the recess, said mechanism having a web and an element provided with an opening therein, said opening being arranged to be brought into register with said opening, means controlled by the movement of the platform for bringing said opening in the element into register with the opening in the recess to expose the web to be acted upon by the hen leaving the passage, and a spring pressed reciprocating device in the bottom of said passage adjacent the entrance for moving the element to close the opening in the recess.

CONSTANTIN A. SIFAKAS.